US012190058B2

(12) United States Patent
Nonomura

(10) Patent No.: US 12,190,058 B2
(45) Date of Patent: Jan. 7, 2025

(54) CHARACTER INPUT DEVICE, CHARACTER INPUT METHOD, AND COMPUTER-READABLE STORAGE MEDIUM STORING A CHARACTER INPUT PROGRAM FOR SEARCHING A DICTIONARY TO DETERMINE REGISTRATION OF A CHARACTER STRING

(71) Applicant: OMRON Corporation, Kyoto (JP)

(72) Inventor: Yui Nonomura, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/145,086

(22) Filed: Dec. 22, 2022

(65) Prior Publication Data

US 2023/0222289 A1 Jul. 13, 2023

(30) Foreign Application Priority Data

Jan. 7, 2022 (JP) ................................. 2022-001497

(51) Int. Cl.
*G06F 40/274* (2020.01)
*G06F 40/242* (2020.01)

(52) U.S. Cl.
CPC .......... *G06F 40/274* (2020.01); *G06F 40/242* (2020.01)

(58) Field of Classification Search
None
See application file for complete search history.

(56) References Cited

U.S. PATENT DOCUMENTS

| 8,010,344 B2* | 8/2011 | Zhang | G06F 16/3338 704/10 |
| 8,307,281 B2* | 11/2012 | Ueda | G06F 40/242 715/264 |
| 8,412,517 B2* | 4/2013 | Zhang | G06F 16/3338 704/8 |
| 8,943,051 B2* | 1/2015 | Fan | G06F 40/55 707/726 |

(Continued)

FOREIGN PATENT DOCUMENTS

| JP | 2018-152818 A | 9/2002 |
| JP | 2002-297587 A | 10/2002 |
| JP | 2003-186873 A | 7/2003 |

OTHER PUBLICATIONS

"How to Add a Word to the Dictionary in Microsoft Word", Dec. 5, 2019 (Retrieved on Apr. 27, 2023), pp. 1-11, Retrieved from the Internet: URL:https://www.wikihow.com/Add-a-Word-to-the-Dictionary-in-Microsoft-Word, Relevance is indicated in the EESR issued on May 9, 2023.

(Continued)

*Primary Examiner* — Maikhanh Nguyen
(74) *Attorney, Agent, or Firm* — METROLEX IP LAW GROUP, PLLC; Robert L. Scott, Esq

(57) ABSTRACT

A character input device according to one or more embodiments may include: an output unit configured to output a first character string to an application program having a suggestion function; a detector configured to detect selection of a second character string that is presented in correspondence with the first character string by the application program; and a registration unit configured to register, in a dictionary database, the second character string that is detected, by the detector, to have been selected.

3 Claims, 9 Drawing Sheets

(56) References Cited

U.S. PATENT DOCUMENTS

| | | | |
|---|---|---|---|
| 9,122,672 B2* | 9/2015 | Griffin | G06F 3/0237 |
| 9,524,290 B2* | 12/2016 | Pasquero | G06F 40/274 |
| 10,338,809 B2* | 7/2019 | Shinomiya | G06F 3/04897 |
| 11,086,411 B2* | 8/2021 | Yamada | G06F 3/0233 |
| 11,237,644 B2* | 2/2022 | Ichikawa | G06F 40/274 |
| 11,347,377 B2* | 5/2022 | Nonomura | G06F 3/0237 |
| 2003/0093263 A1* | 5/2003 | Chen | G06F 40/289 704/10 |
| 2005/0114327 A1* | 5/2005 | Kumamoto | G06F 16/3344 |
| 2008/0162118 A1* | 7/2008 | Itoh | G06F 40/242 704/10 |
| 2009/0278853 A1* | 11/2009 | Ueda | G06F 3/018 345/581 |
| 2010/0185438 A1* | 7/2010 | De La Cruz | G06F 40/242 704/10 |
| 2013/0041890 A1* | 2/2013 | Nakayama | G06F 40/242 707/E17.082 |
| 2014/0278349 A1* | 9/2014 | Grieves | G06F 40/242 704/8 |
| 2014/0379744 A1 | 12/2014 | Kuo et al. | |
| 2015/0003735 A1* | 1/2015 | Feng | G06F 3/0237 382/189 |
| 2015/0261741 A1* | 9/2015 | Ueda | G06F 16/3344 704/10 |
| 2017/0255598 A1* | 9/2017 | Sendai | G10L 15/1815 |
| 2017/0277425 A1* | 9/2017 | Shinomiya | G06F 3/04883 |
| 2017/0285761 A1* | 10/2017 | Yagi | G06F 3/0482 |
| 2017/0308273 A1 | 10/2017 | Choi | |
| 2018/0267621 A1* | 9/2018 | Ichikawa | G06F 3/0237 |
| 2018/0268118 A1* | 9/2018 | Uebuchi | G06F 40/242 |
| 2019/0034405 A1 | 1/2019 | Ivan et al. | |
| 2019/0272044 A1* | 9/2019 | Yamada | G06F 3/0237 |
| 2020/0293158 A1* | 9/2020 | Yamada | G06F 3/0233 |

OTHER PUBLICATIONS

Extended European search report (EESR) issued on May 9, 2023 in a counterpart European patent application.

* cited by examiner

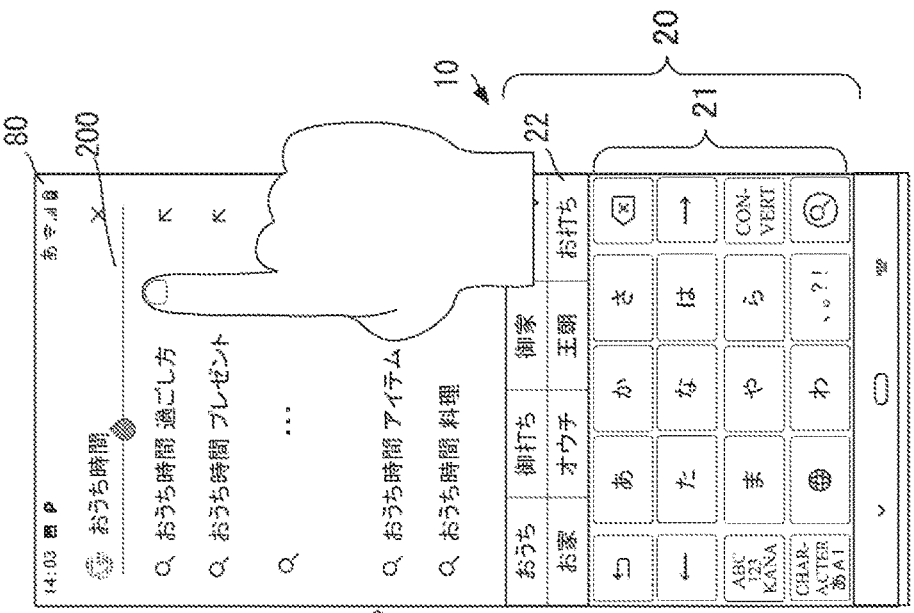
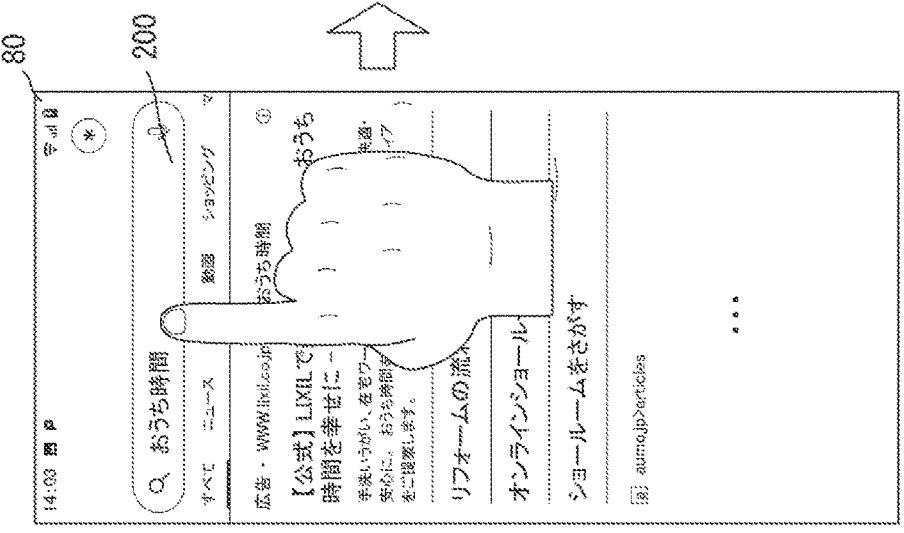
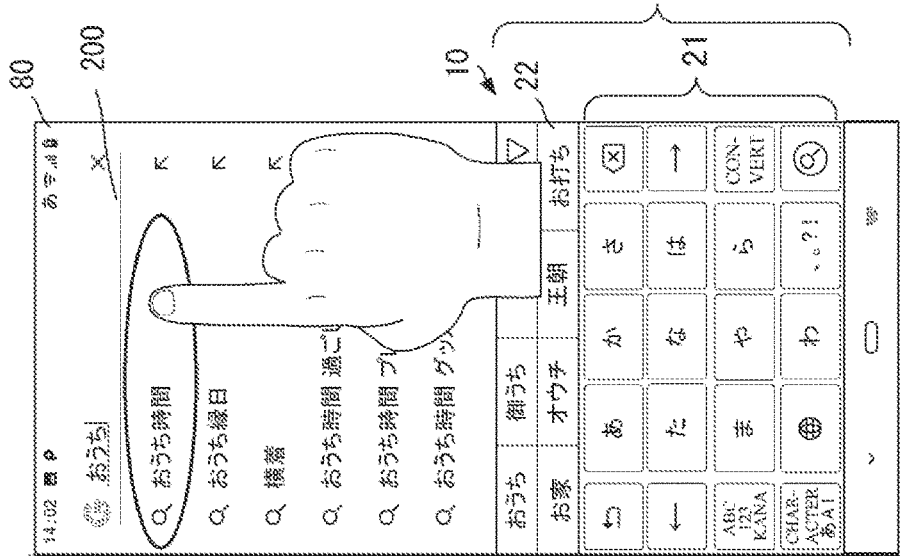

CHARACTER INPUT DEVICE, CHARACTER INPUT METHOD, AND COMPUTER-READABLE STORAGE MEDIUM STORING A CHARACTER INPUT PROGRAM FOR SEARCHING A DICTIONARY TO DETERMINE REGISTRATION OF A CHARACTER STRING

CROSS-REFERENCES TO RELATED APPLICATIONS

This application claims priority to Japanese Patent Application No. 2022-001497 filed on Jan. 7, 2022, the entire contents of which are incorporated herein by reference.

FIELD

The disclosure relates to a technique for supporting character input.

BACKGROUND

Application programs (hereinafter simply referred to as applications) for e-mail, notepads, or the like in which a user inputs character strings are installed in electronic devices such as smartphones. A character input device for the user to input character strings is provided in the electronic devices. The character input device has a dictionary database in which (e.g. in the case of Japanese language input) pronunciation character strings (hiragana (a type of Japanese syllabograms)) and converted character strings are registered in association with each other, as described in JP 2018-152818A, for example. The character input device extracts, from the dictionary database, converted character strings corresponding to a pronunciation character string that is input by the user, presents the extracted converted character strings to the user, and outputs the converted character string that is selected by the user to the application. Note that, depending on the type of application, the character input device outputs the pronunciation character string that is input by the user to the application.

JP 2018-152818A is an example of background art.

SUMMARY

However, applications with a suggestion function (e.g., web browser) are also installed in electronic devices such as smartphones. An application with a suggestion function (e.g. a prediction function for predictive character input) presents character strings of words related to a character string (pronunciation character string or converted character string) input by the user and allows the user to select one.

The character strings presented by the suggestion function also include words of character strings that are not registered in the dictionary database. Therefore, if a word that has been previously presented on an application with the suggestion function and selected by the user is not registered in the dictionary database, it may take time and effort to perform an operation to input the word to another application (particularly, an application that does not have the suggestion function (e.g., e-mail or notepad)).

Accordingly, one or more embodiments may provide a technique that allows the user to easily perform an operation to input a character string of a word that has been previously presented by the suggestion function and selected.

First, terms used in one or more embodiments are defined. A "suggestion function" refers to a function of presenting, to a user, character strings of words related to a character string (pronunciation character string or converted character string) input by the user and allowing the user to select one of the presented words. If, for example, "おうち" (transcription: 'ouchi', which means 'home') is input, the suggestion function suggests "おうち時間" (transcription: 'ouchi-ji-kan', which means 'time at home'), "おうち縁日" (transcription: 'ouchi-en'nichi', which means 'festival day at home'), "横着"(transcription: 'ouchaku', which means 'to cut corners'), and so on, as related words. Accordingly, "おうち時間"and "おうち縁日"are coined words, and therefore, these words are usually not registered in the dictionary database. Examples of application programs with the suggestion function include a web browser.

A character input device according to one or more embodiments is configured as follows.

A character input device according to one or more embodiments may include a controller configured to perform operations as an output unit and a detector, and a processor configured with a program that performs functions or operations as a registration unit. The functions or operations performed by the functional units may also be performed in connection with a method to be implemented by a computer, or by a computer executing a character input program stored upon and read from a non-transitory computer-readable storage medium. The output unit outputs a first character string to an application program having a suggestion function. The detector detects selection of a second character string that is presented in correspondence with the first character string by the application program. The registration unit registers, in a dictionary database, the second character string that is detected, by the detector, to have been selected.

Such a configuration may enable character strings presented (suggested) by the suggestion function to be registered in the dictionary database.

For example, in the character input device according to one or more embodiments, the registration unit registers the first character string and the second character string in association with each other in the dictionary database.

For example, in the character input device according to one or more embodiments, the registration unit does not register the second character string in the dictionary database if the second character string is already registered as a word in the dictionary database.

According to one or more embodiments, a technique may be provided that allows the user to easily perform an operation to input a character string of a word that has been previously presented by the suggestion function and selected by the user.

BRIEF DESCRIPTION OF THE DRAWINGS

FIGS. 3A, 3B and 3C are diagrams illustrating character input being performed on a character input device in a first configuration example.

DETAILED DESCRIPTION

Hereinafter, a character input device, character input method, and computer-readable storage medium storing a character input program according to one or more embodiments are described with reference to the drawings.

1. Example Application

Figure 1:
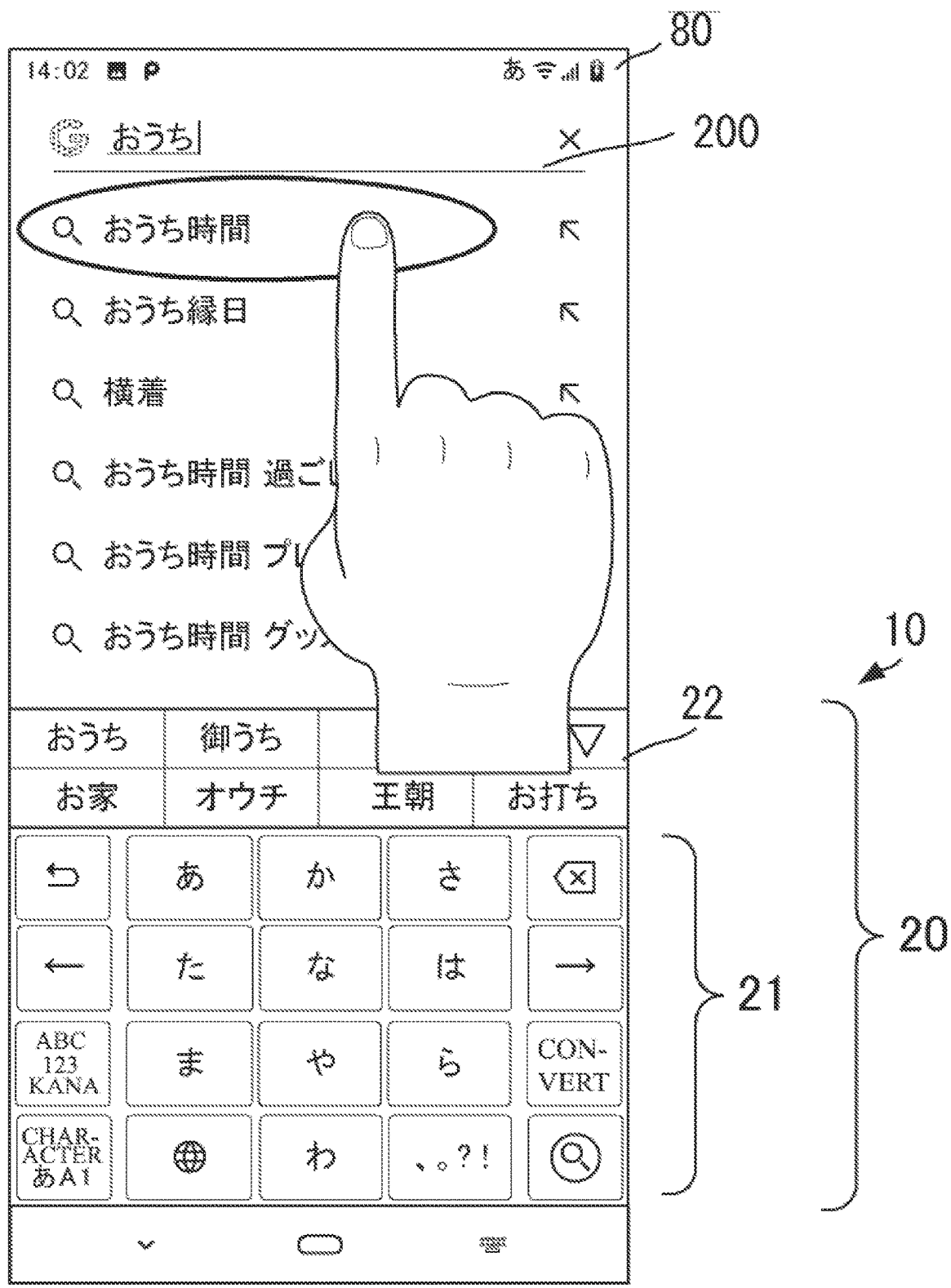
FIG. 1 is a diagram illustrating character input being performed on a character input device in a first configuration example.

FIG. 1 is an illustrative diagram showing character input being performed on a character input device 10 in a first configuration example. A user performs an operation to search for web pages with a search word (character string) that is input using the character input device 10.

The character input device 10 is installed in an electronic device such as a smartphone, for example. Note that the electronic device according to one or more embodiments is not limited to a smartphone, and may be any device that enables character input, such as a tablet or a personal computer.

Specific examples where the user inputs characters will be described. A smartphone 80 has a touch panel. The user starts an application installed in the smartphone 80. The user inputs characters using the application.

The character input device 10 includes a display section 20, a detector 30, a display controller 35, a controller 40, a dictionary database 50, and an output unit 60. The detector 30 accepts the results of the user operating the touch panel of the smartphone 80. For example, the detector 30 provides a notification to the display controller 35 that the user has started the application to input characters and is about to begin to input characters (tap a character input field).

The display controller 35 starts the display section 20. The display section 20 includes a character input portion 21 and a candidate display portion 22. The detector 30 accepts a character string that is input by the user using the character input portion 21, and outputs the accepted character string to the output unit 60. The output unit 60 outputs the character string to the application of the smartphone 80.

The user searches for web pages with a search word (character string) using a web browser (hereinafter, "browser"), and Google (registered trademark), for example. Here, the user inputs the character string to a search field 200 on the browser. Note that any browser with a suggestion function may be used. Further, the type of application is not limited as long as the application has a suggestion function.

The user taps the search field 200 on the browser. In response, the detector 30 causes the display controller 35 to display the character input portion 21 and the candidate display portion 22.

The user operates the character input portion 21 and inputs characters. More specifically, the detector 30 detects the character string that is input by the user using the character input portion 21. The detector 30 outputs the character string to the output unit 60. The output unit 60 outputs the characters input by the user to the search field 200 on the browser. The search word (character string) is thus input to the browser. The browser executes the search for web pages using the search word (character string). A series of processing for inputting the character string is hereinafter referred to as "to input characters".

The following is an example where the user inputs "おうち時間(transcription: 'ouchi-jikan', which means 'time at home') (space) テレワーク(transcription: 'terewaaku', which means 'telework')" as search words. The user inputs the character string "おうち時間" and then inputs a space. Further, the user inputs the character string "テレワーク" following the space.

First, the user starts the browser and inputs a first character string "おうち". The browser uses the suggestion function to present candidates such as character strings "おうち時間", "おうち縁日", "横着", "おうち時間(space) 過ごし方(transcription: 'sugoshikata', which means 'how to spend time')", "おうち時間(space) プレゼント(transcription:'purezento', which means 'present')", and "おうち時間(space) グッズ(transcription: 'guzzu', which means 'goods')". The user selects a second character string "おうち時間".

Next, the user taps the search field 200 on the browser again to input a third character string "テレワーク". The user inputs a space and the third character string "テレワーク"in the search field 200. In response, the browser displays the search results corresponding to the conditions given by the character string "おうち 時間(space) テレワーク".

Here, the character input device 10 registers that the user has input the first character string "おうち"in order to input the second character string "おうち時間". More specifically, the character input device 10 registers the first character string "おうち"and the second character string "おうち時間"in association with each other in the dictionary database 50. That is, when the user inputs characters, the user may obtain the second character string "おうち時間"by inputting the first character string "おうち". In the following example, the first character string is "おうち". Note that the first character string may also be the character string "おうちじ(transcription: 'ouchiji')" or the character string "おうちじか(transcription: 'ouchijika').

The above described configuration may allow the user to register a character string selected using the suggestion function. More specifically, the user may register a character string presented by the suggestion function while searching for web pages with a search word using a browser or the like. That is, the user may easily input characters, and the user's convenience improves.

2. Configuration Example 1

Figure 2:
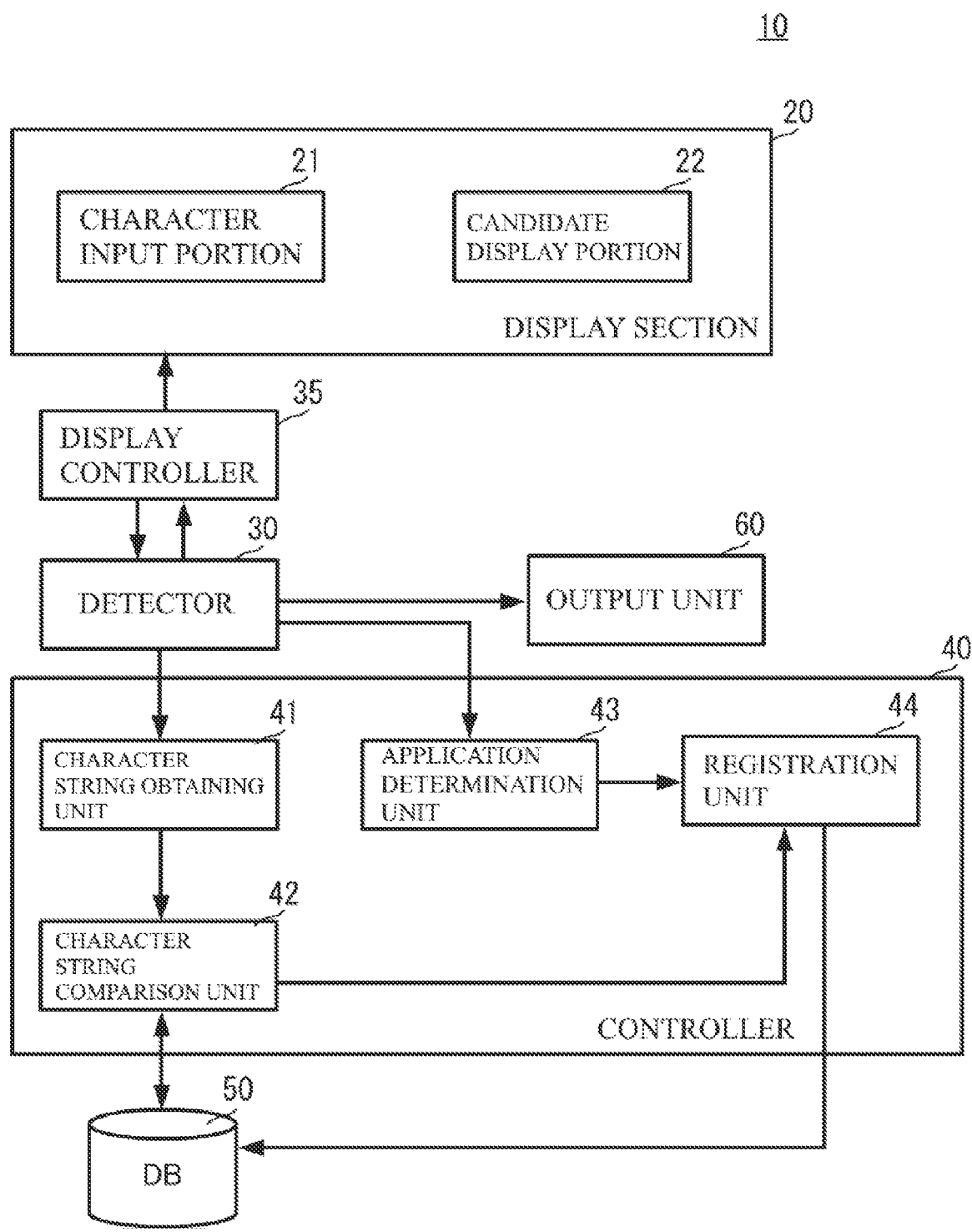
FIG. 2 is a block diagram illustrating a configuration of a character input device in a first configuration example.

FIG. 2 is a block diagram showing a configuration of the character input device 10 in a first configuration example. FIGS. 3(A), 3(B), and 3(C) are illustrative diagrams showing character input being performed using the smartphone 80 to which the character input device 10 in a first configuration example is applied. Note that the example to which the character input device 10 is applied is not limited to a smartphone, and may be any electronic device that enables character input.

As shown in FIG. 2, the character input device 10 includes the display section 20, the detector 30, the display controller 35, the controller 40, the dictionary database 50, and the output unit 60.

The display section 20 includes the character input portion 21 and the candidate display portion 22, as mentioned above. For example, the character input portion 21 and the candidate display portion 22 are arranged on the screen of the smartphone 80, as shown in FIGS. 3(A) to 3(C). Various keys for character input are displayed in the character input portion 21. Conversion candidates obtained by a later-described method and/or narrowed-down conversion candidates are displayed in the candidate display portion 22. Note that the character input portion 21 is, for example, a software keyboard.

As mentioned above, the smartphone 80 has a touch panel. The touch panel detects an operation performed by the user. More specifically, the touch panel detects operations performed on the search field 200 on the browser, and the character input portion 21 and the candidate display portion 22 included in the display section 20. Detection of operations includes, for example, detection of an operation position, a time length of the operation, a temporal change in the operation position, or the like. The detection results of the operations are output to the detector 30. The detector 30 outputs the results input from the touch panel to the display controller 35, the controller 40, and the output unit 60 in accordance with these results.

The controller 40 includes a character string obtaining unit 41, a character string comparison unit 42, an application determination unit 43, and a registration unit 44. Note that the controller 40 and the display controller 35 may be constituted by one or more hardware CPUs (a processor or processors), a memory or memories, and other electronic circuits. The hardware CPU or CPUs, e.g. when configured by a character input program, performs operations as the character string obtaining unit 41, the character string comparison unit 42, the application determination unit 43, and the registration unit 44 when the character input program according to one or more embodiments is executed. The operations as the detector 30, the display controller 35 and the output unit 60 may additionally be performed under by execution of the character input program, or may operate as independent circuits. The memory has an area for loading the character input program according to one or more embodiments and an area for temporarily storing data or the like generated when the character input program according to one or more embodiments is executed. The controller 40 may alternatively be an LSI in which a hardware CPU, a memory, and the like are integrated. The hardware CPU may be a computer that executes a character input method according to one or more embodiments.

A character string, pronunciation, part of speech, and the like of each word are registered in association with each other in the dictionary database 50. The dictionary database 50 is used to convert input characters (pronunciation) to an associated character string (converted character string) and make predictions. Note that the dictionary database 50 in a first configuration example is built in the character input device 10, but may alternatively be provided on the cloud. Also, the dictionary database 50 may be divided into two parts, namely a system dictionary and a user dictionary.

The character string obtaining unit 41 obtains a character string that is input to the search field 200 or a selected character string. The character string comparison unit 42 searches the dictionary database 50 to check whether the character string is registered. The application determination unit 43 determines whether or not the user has started the same application on the character input device 10. The registration unit 44 registers the character string in the dictionary database 50 in accordance with the determination result.

Next, a specific configuration of the character input device 10 will be described with reference to FIGS. 2 and 3(A) to 3(C).

As shown in FIG. 3(A), the user starts the browser. In the following example, the user searches for web pages with the search words (character string): "おうち時間(space) テレワーク". Here, the user inputs a plurality of search words using the browser. For example, the user inputs a plurality of conditions by dividing the character string "おうち時間(space) テレワーク"into a character string "おうち時間" and a character string "テレワーク"by a space.

The user starts the browser and displays a search page. The search field 200 is displayed on the search page. Upon the user tapping the search field 200, the character input portion 21 and the candidate display portion 22 are displayed. The user uses the character input portion 21 to input the first character string "おうち", which is a part of the character string "おうち時間".

Here, the detector 30 provides a notification to the application determination unit 43 that the browser has been started. Note that the application determination unit 43 temporarily stores the browser as a first application.

In response to the first character string "おうち"being input to the search field 200, the suggestion function of the browser displays candidates, namely character strings "おうち時間", "おうち縁日", "横着", "おうち時間(space) 過ごし方", "おう ち時間(space) プレゼント", "おうち時間(space) グッズ",or the like. At this point, the character string " おうち時間"is not registered in the dictionary database 50. Accordingly, candidates such as "おうち", "御うち(transcription: 'ouchi')", and "お家(transcription: 'ouchi')" are displayed in the candidate display portion 22.

Next, the user selects the character string "おうち時間"(hereinafter, "おうち時 間"is referred to as "the second character string") that is displayed by the suggestion function of the browser. The detector 30 detects that the second character string "おうち時間"has been selected. The browser recognizes that the second character string "おうち時間"has been confirmed, and causes the detector 30 to end the character input portion 21 and the candidate display portion 22. The detector 30 causes the display section 20 to end the character input portion 21 and the candidate display portion 22. As shown in FIG. 3(B), the browser displays web page links as the results of the search performed with the second character string "おうち時間".

The detector 30 outputs, to the character string obtaining unit 41, the first character string "おうち"input to the search field 200. The character string obtaining unit 41 temporarily saves the first character string "おうち"in a cache or the like. Note that the first character string "おうち"need not necessarily be saved in a cache or the like, and may alternatively be temporarily saved in the dictionary database 50.

Next, as shown in FIG. 3(C), the user taps the search field 200 in order to input the third character string "テレワーク".

In response to the search field 200 being tapped, the character input portion 21 and the candidate display portion 22 are displayed in the display section 20, as mentioned above.

Here, the detector 30 detects that the search field 200 has been selected (tapped). First, the character string obtaining unit 41 obtains the second character string "おうち時間"displayed in the search field 200. The character string obtaining unit 41 associates the first character string "おうち"saved in the cache with the second character string "おうち時間". In other words, the character string obtaining unit 41 estimates that the user wants to input the second character string "おうち時 間"by inputting the first character string "おうち", and associates the first character string "おうち"with the second character string "おうち時間".

The character string obtaining unit 41 outputs the first character string "おう ち"and the second character string "おうち時間"to the character string comparison unit 42. The character string comparison unit 42 performs a search to check whether the first character string "おうち"and the second character string "おうち時 間"are registered in association with each other in the dictionary database 50. If the first character string "おうち"and the second character string "おうち時間"are not registered in association with each other in the dictionary database 50, the character string comparison unit 42 outputs the first character string "おうち"and the second character string "おうち時間"to the registration unit 44.

Note that if the first character string "おうち"and the second character string "おうち時間"are registered in association with each other in the dictionary database, the configuration may also be such that the priority in displaying the second character string "おうち時間"is raised as a result of inputting the first character string "おうち".

Next, the detector 30 provides a notification to the application determination unit 43 that the search field 200 on the browser has been tapped (selected) again. The application determination unit 43 temporarily stores the browser as a second application (i.e. information indicating that the browser is the second application). The application determination unit 43 determines whether or not the first application is the same as the second application. Accordingly, it is determined that the first and second applications started by the user are the same browser. The application determination unit 43 outputs the result to the registration unit 44.

The registration unit 44 registers the first character string "おうち"and the second character string "おうち時間"in association with each other in the dictionary database 50 using the result (the first character string "おうち"and the second character string "おうち時間") input from the character string comparison unit 42 and the result (indicating that the first and second applications are the same) input from the application determination unit 43.

As a result, the user may start, for example, an e-mail application or the like and cause the candidate display portion 22 to display the second character string "おうち時間"as a candidate by inputting the first character string "おうち".

The user then inputs a space and the third character string "テレワーク"following the second character string "おうち時間"displayed in the search field 200. The user may obtain desired search results by performing the input. That is, the first character string "おうち"and the second character string "おうち時間"may be registered in association with each other while the user is performing a search on the browser, thereby improving the user's convenience.

3. Operation Example

Figure 4:
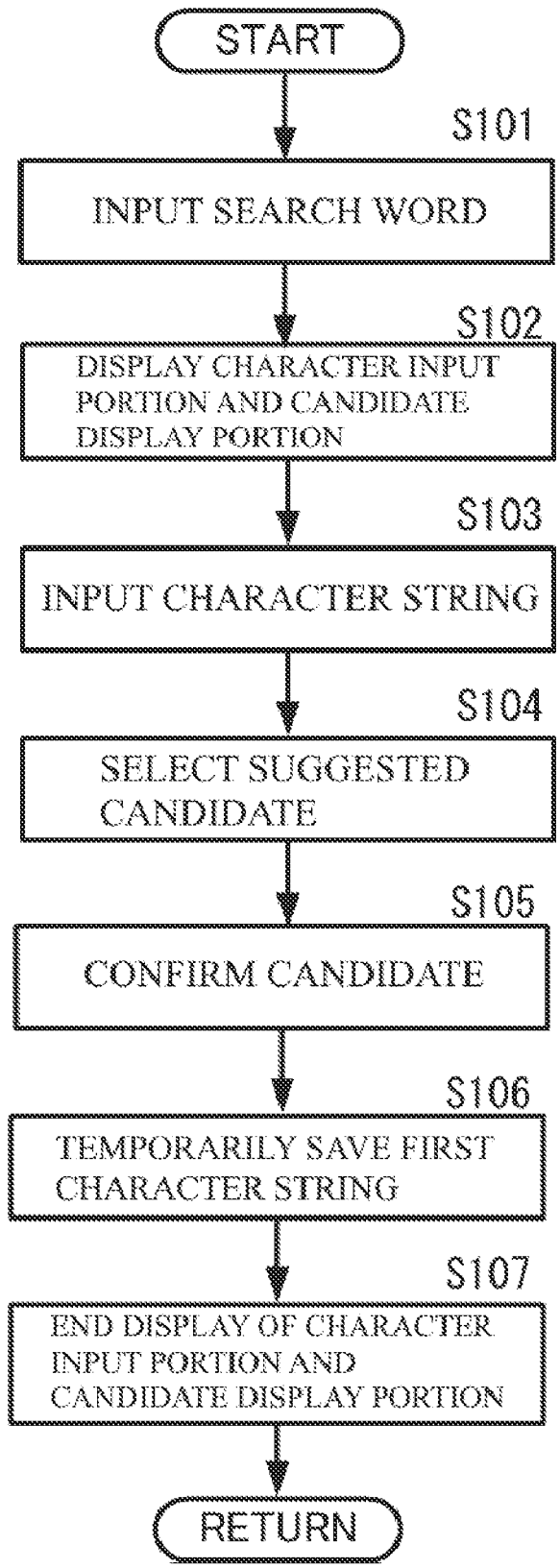
FIG. 4 is a flowchart illustrating a flow of processing in a character input device in an operation example.
Figure 5:
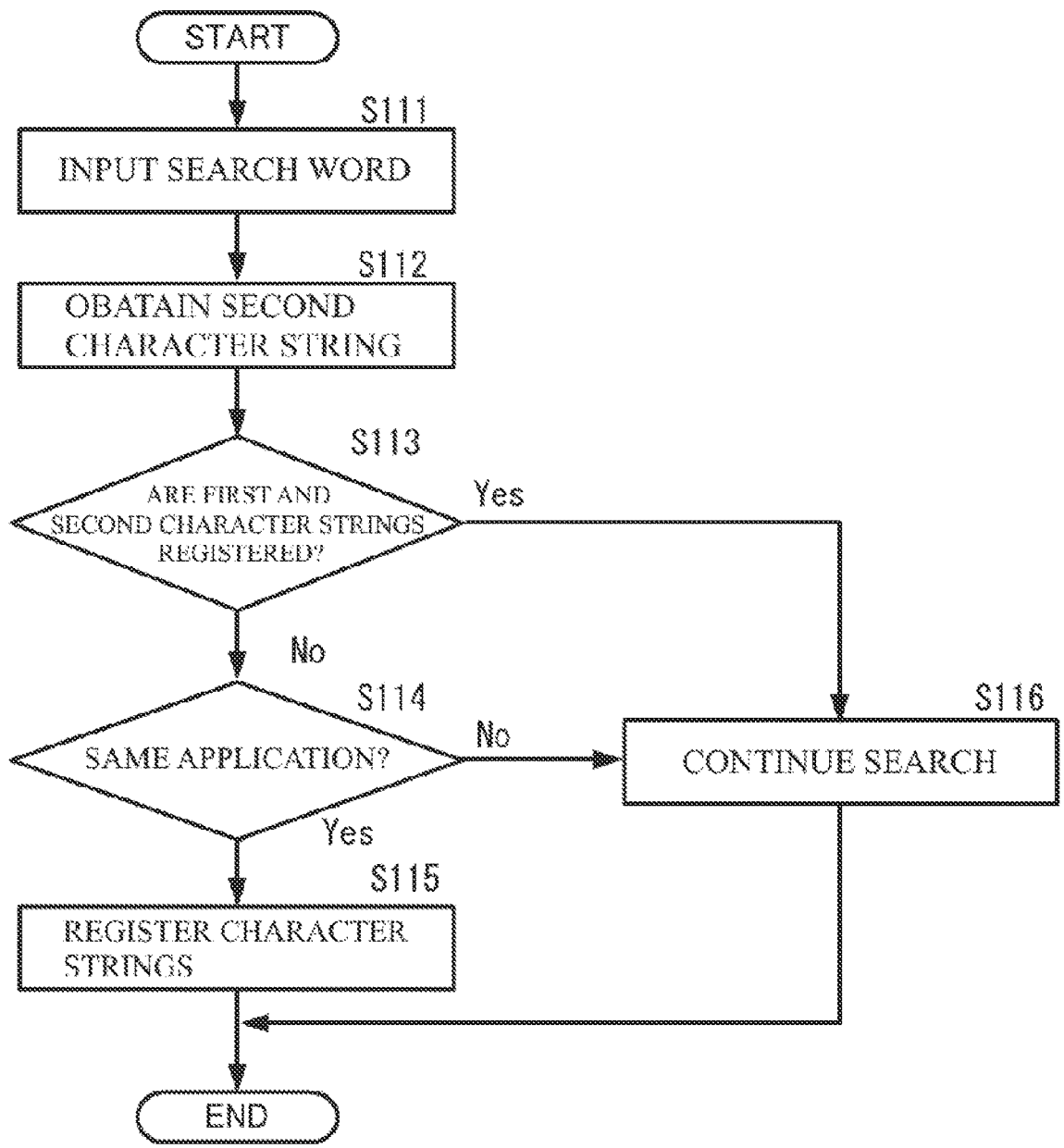
FIG. 5 is a flowchart illustrating a flow of processing in a character input device in an operation example.

FIG. 4 is a flowchart showing the flow of processing in the character input device 10 in an operation example. FIG. 5 is a flowchart showing the flow of processing in the character input device 10 in an operation example. As the flow of processing, the flowchart in FIG. 4 is executed, followed by the flowchart in FIG. 5.

First, the flow of processing in the character input device 10 will be described with reference to FIGS. 3(A) to 3(C) and 4. The user starts the browser installed in the smartphone 80 (S101). Here, the application determination unit 43 temporarily stores the browser as a first application.

The user taps the search field 200. The detector 30 causes the display controller 35 to start the display section 20. The display section 20 displays the character input portion 21 and the candidate display portion 22 (S102).

The search field 200 accepts input of a character string by the user. The user inputs, for example, a first character string "おうち"using the character input portion 21 (S103).

The suggestion function of the browser displays, as candidates, character strings "おうち時間", "おうち縁日", "横着", "おうち時間(space) 過ごし方", "おうち時間(space) プレゼント", "おうち時間(space) グッズ"or the like. The user selects a second character string "おうち時間"(S104).

The browser recognizes that the second character string "おうち時間"has been confirmed (S105). First, in response to the second character string "おうち時 間"being confirmed, the browser executes a search for web pages with the second character string "おうち時間"a search word. The detector 30 outputs the first character string "おうち"input to the search field 200 to the character string obtaining unit 41. The character string obtaining unit 41 temporarily saves the first character string "おうち"in the cache or the like (S106).

The detector 30 causes the display controller 35 to end the display section 20. The display controller 35 ends the character input portion 21 and the candidate display portion 22 of the display section 20 (S107).

Next, processing following FIG. 4 will be described with reference to the flowchart in FIG. 5. The user taps the search field 200 again (S111). Here, the detector 30 provides a notification to the application determination unit 43 that the user is using the browser. The application determination unit 43 temporarily stores the browser as a second application.

Next, the character string obtaining unit 41 obtains the second character string "おうち時間"displayed in the search field 200 (S112).

The character string obtaining unit 41 outputs the first character string "おう ち"and the second character string "おうち時間"to the character string comparison unit 42. The character string comparison unit 42 searches the dictionary database 50 to check whether or not the first character string "おうち"and the second character string "おうち時間"are registered in association with each other (S113). If the first character string "おうち" and the second character string "おうち時間" are registered in association with each other in the dictionary database 50 (S113: Yes), the third character string "テレワーク" is input to the search field 200 without registering the first character string "おうち" and the subsequent processing is continued (S116).

If the first character string "おうち" and the second character string "おうち時間" are not registered in association with each other in the dictionary database 50 (S113: No), the character string comparison unit 42 checks whether or not the first and second applications are the same (S114). If the first and second applications are not the same (S114: No), the registration unit 44 does not register the first character string "おうち" and the second character string "おうち時間". The user inputs the third character string "テレワーク" in the search field 200. The user then continues the search (S116).

Note that "the first and second applications are not the same" refers to, for example, the case where the user starts an e-mail application without tapping (selecting) the search field 200 on the browser during processing performed after the user has executed the search with the first character string using the browser.

If the first and second applications are the same (S114: Yes), the registration unit 44 registers the first character string "おうち" and the second character string "おうち時間" in association with each other in the dictionary database 50 using the result (the first character string "おうち" and the second character string "おうち時間" input from the character string comparison unit 42 and the result (indicating that the first and second applications are the same) input from the application determination unit 43 (S115). As a result, the second character string "おうち時間" is registered so that the second character string "おうち時間" may be found in the dictionary database 50, by inputting the first character string "おうち".

The user then inputs a space and the third character string "テレワーク" following the second character string "おうち時間" displayed in the search field 200. The user may obtain desired search results by performing the input.

In the above configuration, if no desired candidate is present among candidates corresponding to the first character string "おうち" that are presented by the suggestion function, the user explicitly deletes the first character string. Accordingly, it may be favorable that the first character string saved in the cache or the like is deleted. As a result, registration of unnecessary character strings may be reduced.

The above configuration enables registration of character strings that are input on an application with the suggestion function. That is, the user may also easily use character strings registered using the suggestion function on applications (e.g., e-mail, notepad etc.) that does not have a suggestion function.

Further, a search is performed to check whether the first character string "お うち" and the second character string "おうち時間" are registered in the dictionary database 50, and registration is performed if these character strings are not present. Therefore, redundant registration may be avoided. As a result, search results showing appropriate candidates (prediction candidates) may be provided to the user. Moreover, the data volume of the dictionary database 50 does not increase.

Note that if there is another second character string (e.g., "おうち縁日 etc.) that is associated with the first character string "おうち", the priority in displaying the second character string "おうち時間" may be raised. It may be favorable that the priority is determined in accordance with the input frequency and/or use history.

Further, the user need not explicitly register dictionary data (that is, the first character string "おうち" and the second character string "おうち時間") in the dictionary database 50, as in a first configuration example, for example. In other words, the first and second character strings may be registered in the dictionary database 50 while the user is performing an operation to perform a search using the browser. That is, the user's convenience improves.

4. Configuration Example 2

Figure 6:
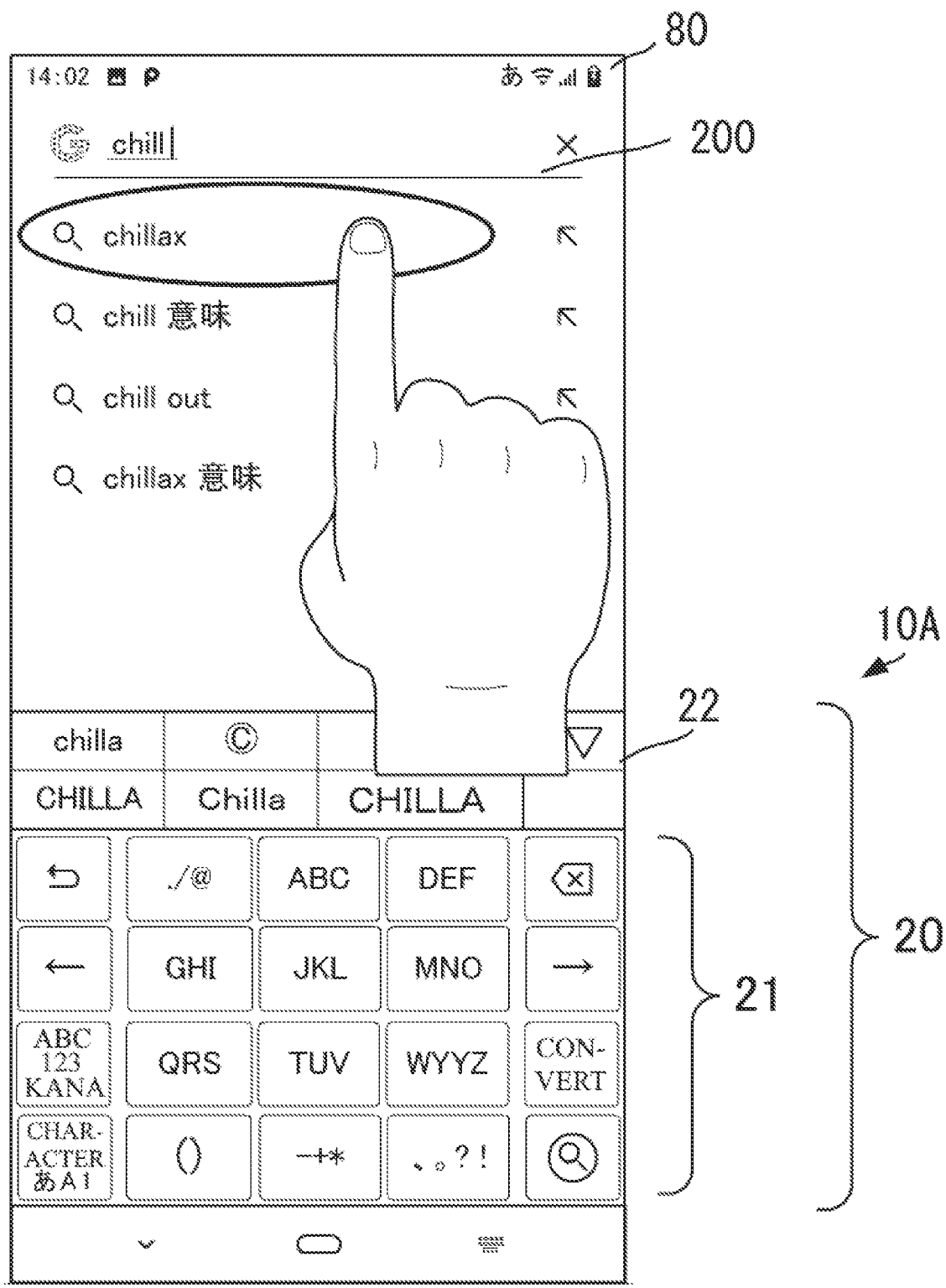
FIG. 6 is a diagram illustrating character input being performed on a character input device in a second configuration example.

Next, a character input device according to a configuration example 2 will be described with reference to the figures. FIG. 6 is an illustrative diagram of character input being performed on a character input device 10A in a second configuration example.

As shown in FIG. 6, the character input device 10A in a second configuration example differs in that the character input portion 21 in the character input device 10 in a first configuration example is in a kana input mode, while the character input portion 21 in a second configuration example is in an alphabetic character input mode. The other configuration of the character input device 10A is the same as the character input device 10, and a description of the same or similar features is omitted. Note that the character input portion 21 in FIG. 6 uses a 12-keyboard (numeric keypad), but may alternatively have a QWERTY keyboard arrangement.

Note that the following is an example where the character input portion 21 is in the alphabetic character input mode. However, the type of language input as a character string is not limited to the alphabetic character input mode, and may alternatively be any other language. For example, the language may be Chinese, in which case the user inputs the phonetic transcription of a word (desired character string) to be input as a character string, or may be German or the like, in which case the user inputs the spelling of a word to be input as a character string.

The user taps the search field 200 on the browser. Thus, the display section 20 of the character input device 10A causes the display section 20 to display the character input portion 21 and the candidate display portion 22. The user operates the character input portion 21 and inputs a search word.

For example, the user inputs a first character string "chill" as a part of a second character string "chillax" to the search field 200. The browser presents candidates such as character strings "chillax", "chill (space) 意味(transcription: 'imi', which means 'meaning')", and "chill (space) out", using the suggestion function. The user selects the second character string "chillax". Thus, the first character string "chill" and the second character string "chillax" may be registered in association with each other in the dictionary database 50.

As described above, a character string selected using the suggestion function may also be registered in not only the kana input mode but also the alphabetic character input mode. That is, the user may easily input characters, and the user's convenience improves.

5. First Variation

Figure 7:
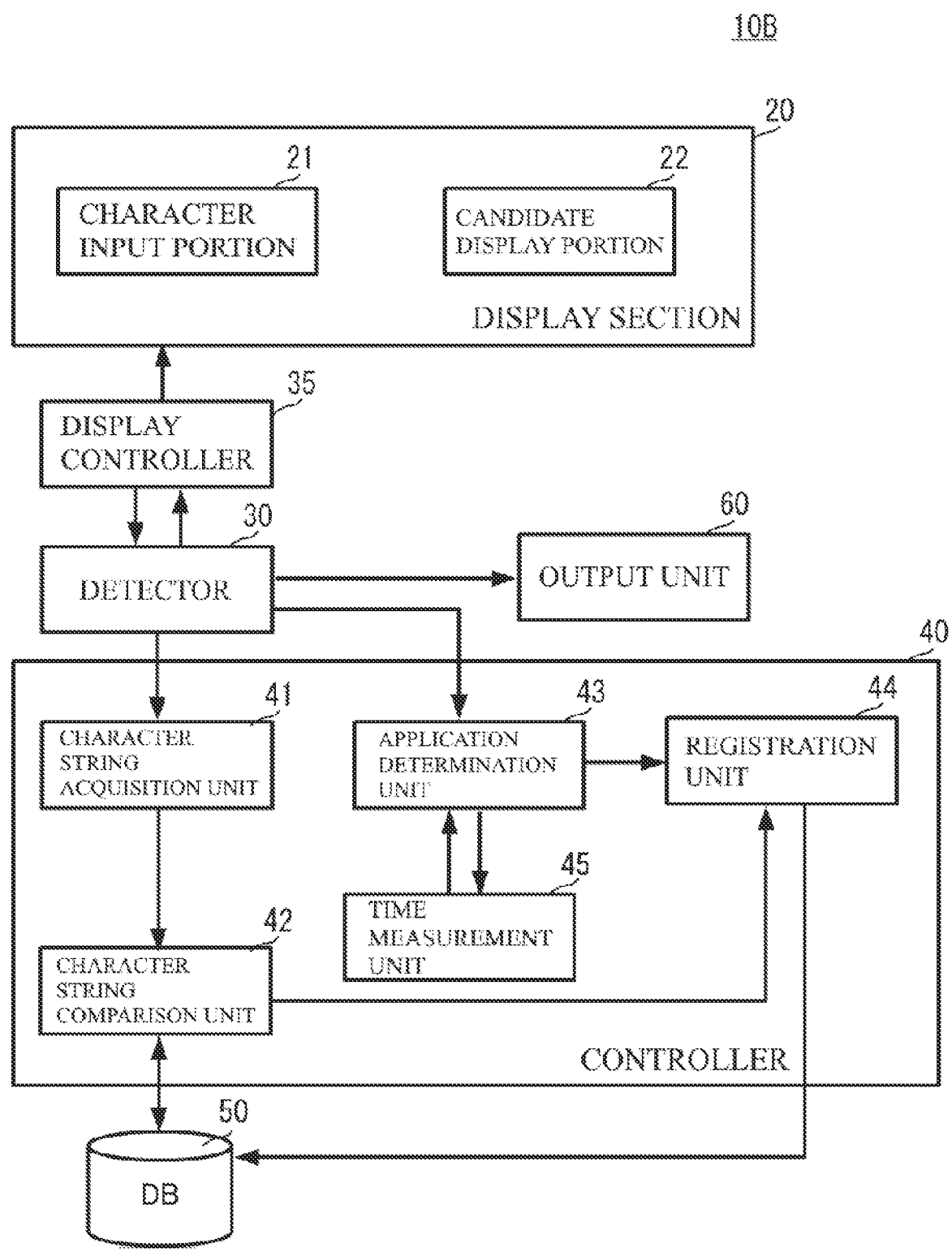
FIG. 7 is a block diagram illustrating a configuration of a character input device in a first variation.
Figure 8:
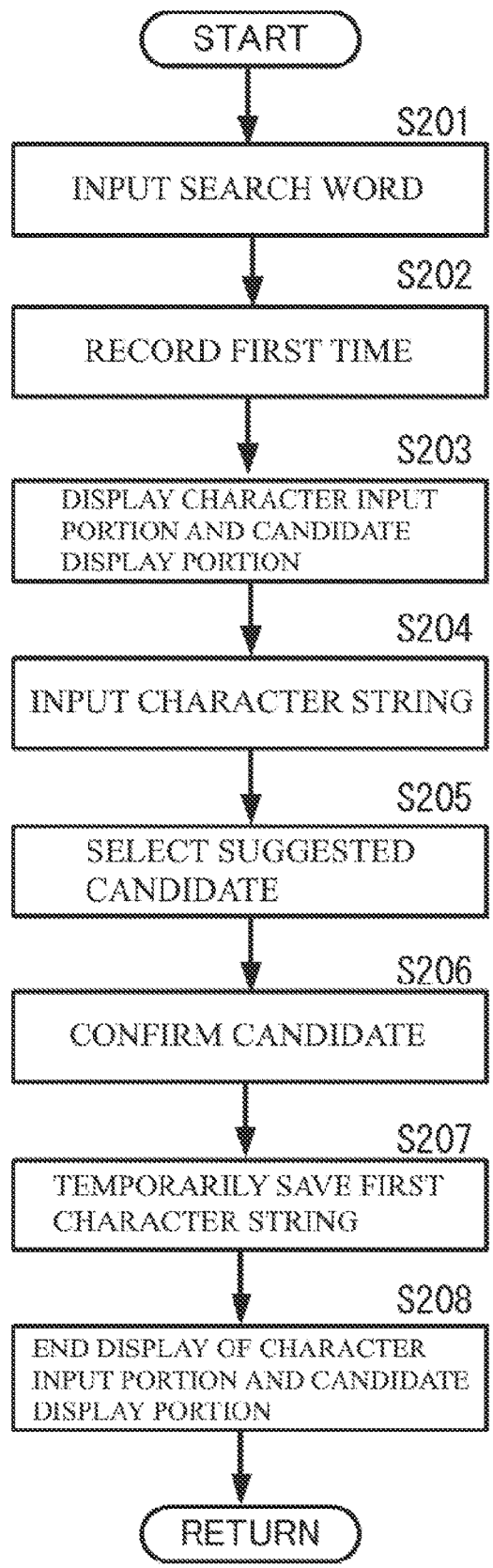
FIG. 8 is a flowchart illustrating a flow of processing in a character input device in a first variation.
Figure 9:
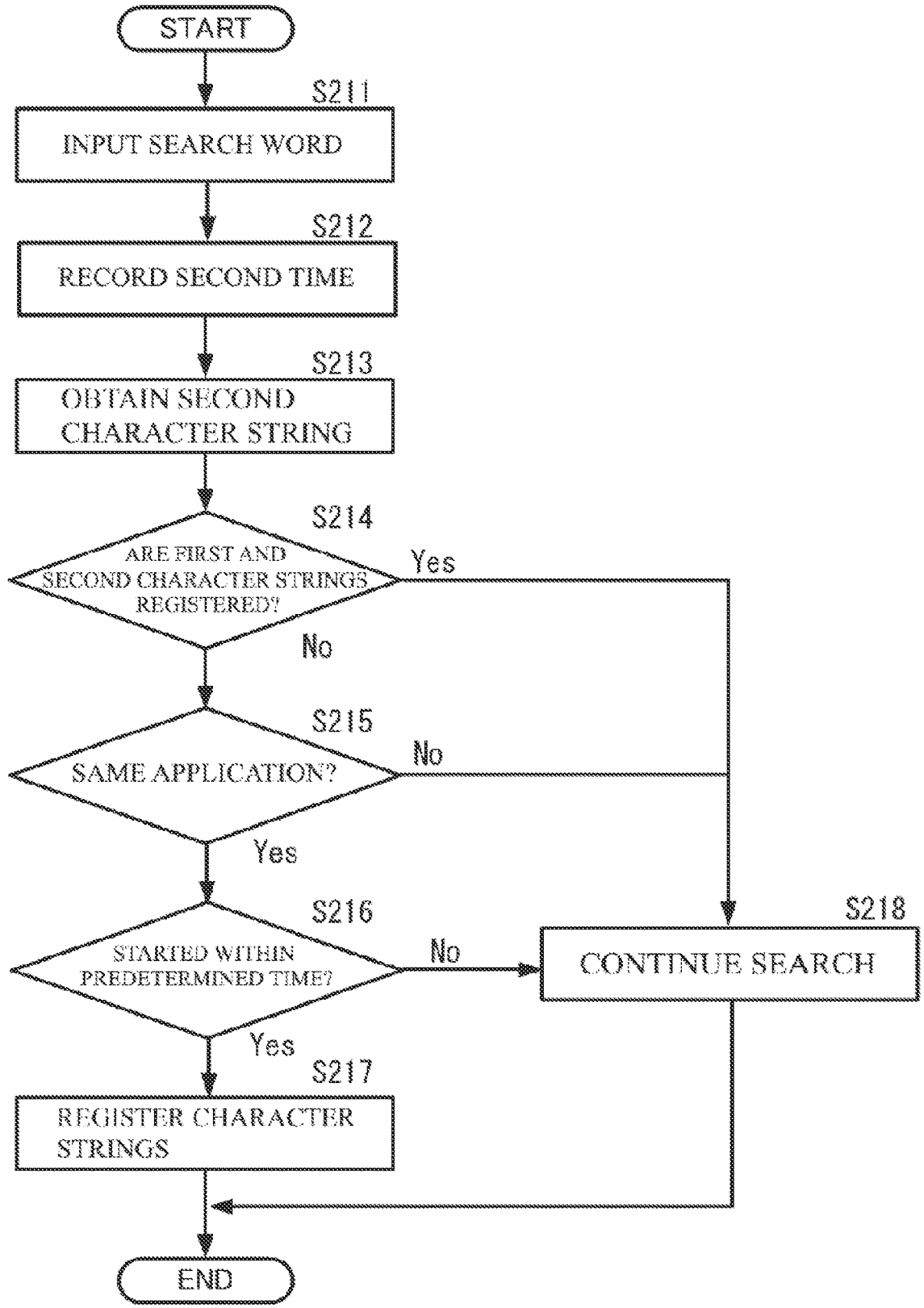
FIG. 9 is a flowchart illustrating a flow of processing in a character input device in a first variation.

Next, a character input device according to a first variation will be described with reference to the figures. FIG. 7 is a block diagram showing a configuration of a character input device 10B in a first variation. FIG. 8 is a flowchart showing the flow of processing in the character input device 10B in a variation 1. FIG. 9 is a flowchart showing the flow of processing in the character input device 10B in a first variation.

As shown in FIG. 7, the character input device 10B according to a first variation differs from the character input device 10 according to a first configuration example in that the character input device 10B includes a time measurement unit 45. The other configuration of the character input device 10B is the same as the character input device 10, and a description of the same features is omitted.

As shown in FIG. 7, the controller 40 includes the character string obtaining unit 41, the character string comparison unit 42, the application determination unit 43, the registration unit 44, and the time measurement unit 45.

The time measurement unit 45 measures a time interval for starting an application (e.g., a browser). A more specific configuration will be described with reference to FIGS. 7, 8, and 9.

The user taps the search field 200 on the browser. Thus, the detector 30 of the character input device causes the display controller 35 to display the character input portion 21 and the candidate display portion 22. The user operates the character input portion 21 and inputs a search word. For example, the user inputs a first character string "おうち".

The detector 30 provides a notification to the application determination unit 43 that the browser has been started. Note that the application determination unit 43 temporarily stores the browser as a first application. The time measurement unit 45 stores the time when the first application was started as a first time.

Next, the user selects a second character string "おうち時間" displayed by the suggestion (predictive) function of the browser. The detector 30 detects that the second character string "おうち時間" has been selected.

The detector 30 outputs, to the character string obtaining unit 41, the first character string "おうち" input to the search field 200. The character string obtaining unit 41 temporarily saves the first character string "おうち" in the cache or the like.

Next, the user taps the search field 200 to input a third character string "テレ ワーク". The detector 30 detects that the search field 200 has been selected (tapped). The character string obtaining unit 41 obtains the second character string "おうち時間" displayed in the search field 200. The character string obtaining unit 41 associates the first character string "おうち" saved in the cache with the second character string "おうち時間".

The character string obtaining unit 41 outputs the first character string "おう ち" and the second character string "おうち時間" to the character string comparison unit 42. The character string comparison unit 42 performs a search in the dictionary database 50 and outputs the first character string "おうち" and the second character string "過ごし方", "おうち時間" to the registration unit 44 in accordance with the search result.

Next, the detector 30 provides a notification to the application determination unit 43 that the search field 200 on the browser has been tapped (selected). The application determination unit 43 temporarily stores the browser as a second application. The application determination unit 43 stores the time when the second application was started as a second time.

The application determination unit 43 determines whether or not the first and second applications are the same application.

The time measurement unit 45 compares the first time with the second time. More specifically, the time measurement unit 45 calculates the time interval between the first time and the second time. The time measurement unit 45 determines whether or not the time interval is within a predetermined time. For example, the time measurement unit 45 determines whether or not the time interval is within 10 seconds. The time measurement unit 45 outputs the result to the application determination unit 43.

If the time interval is within 10 seconds, the registration unit 44 registers the first character string "おうち" and the second character string "過ごし方", "おうち時間" in association with each other in the dictionary database 50. On the other hand, if the time interval is longer than 10 seconds, the first character string "おうち" and the second character string "過ごし方", "おうち時間" are not output to the registration unit 44.

Next, the flow of processing in the character input device 10B will be described with reference to FIGS. 8 and 9. FIG. 8 is a flowchart showing the flow of processing in the character input device 10B in a first variation. FIG. 9 is a flowchart showing the flow of processing in the character input device 10B in a first variation. As the flow of processing, the flowchart in FIG. 8 is executed, followed by the flowchart in FIG. 9.

First, the flow of processing in the character input device 10B will be described with reference to FIG. 8. The user starts the browser (application) (S201). Here, the application determination unit 43 temporarily stores the browser as a first application.

The time measurement unit 45 stores the time when the first application was started as the first time (S202).

The user taps the search field 200. The detector 30 causes the display controller 35 to start the display section 20. The display section 20 displays the character input portion 21 and the candidate display portion 22 (S203).

The search field 200 accepts input of a character string by the user. The user inputs, for example, the first character string "おうち" using the character input portion 21 (S204).

The suggestion function of the browser displays, as candidates, character strings "おうち時間", "おうち縁日", "横着", "おうち時間(space) 過ごし方", "おうち時間(space) プレゼント", "おうち時間(space) グッズ", or the like. The user selects the second character string "過ごし方", "おうち時間" (S205).

The browser recognizes that the second character string "おうち時間"has been confirmed (S206). The detector 30 outputs the first character string "おうち"input to the search field 200 to the character string obtaining unit 41. The character string obtaining unit 41 temporarily saves the first character string "おうち"in a cache or the like (S207).

The detector 30 causes the display controller 35 to end the display section 20. The display controller ends the character input portion 21 and the candidate display portion 22 of the display section 20 (S208).

Next, processing following FIG. 8 will be described with reference to the flowchart in FIG. 9. The user taps the search field 200 (S211). Here, the detector 30 provides a notification to the application determination unit 43 that the user is using the browser. The application determination unit 43 temporarily stores the started browser as a second application.

The time measurement unit 45 stores the time when the second application was started as a second time (S212).

Next, the character string obtaining unit 41 obtains the second character string "おうち時間"displayed in the search field 200 (S213).

The character string obtaining unit 41 outputs the first character string "おうち"and the second character string "おうち時間"to the character string comparison unit 42. The character string comparison unit 42 searches the dictionary database 50 to check whether or not the first character string "おうち"and the second character string "おうち時間"are registered in association with each other (S214). If the first character string "おうち"and the second character string "おうち時間"are registered in association with each other in the dictionary database 50 (S214: Yes), the registration unit 44 does not register the first character string "おうち". The user inputs the third character string "テレワーク"in the search field 200. The user then continues the search (S218).

If the first character string "おうち"and the second character string "おうち時間"are not registered in association with each other in the dictionary database 50 (S214: No), the application determination unit 43 checks whether the first and second applications are the same (S215). If the first and second applications are not the same (S215: No), the registration unit 44 does not register the first character string "おうち"and the second character string "おうち時間". The user inputs the third character string "テレワーク"in the search field 200. The user then continues the search (S218).

If the first and second applications are the same (S215: Yes), the time measurement unit 45 compares the first time with the second time (S216). More specifically, the time measurement unit 45 calculates the time interval between the first time and the second time. The time measurement unit 45 determines whether or not the time interval is within a predetermined time. For example, the time measurement unit 45 determines whether or not the time interval is within 10 seconds. The time measurement unit 45 outputs the result to the application determination unit 43.

If the time interval is within 10 seconds (S216: Yes), the registration unit 44 registers the first character string "おうち"and the second character string "おうち時間"in association with each other in the dictionary database 50 (S217). On the other hand, if the time interval is longer than 10 seconds (S216: No), the first character string "おうち"and the second character string "おうち時間"are not output to the registration unit 44. Also, the third character string "テレワーク"is input to the search field 200. The user then continues the search (S218).

As a result, the first character string "おうち"and the second character string "おうち時間"may be registered in association with each other in the dictionary database 50 if the first and second applications are the same and the time interval is within 10 seconds.

That is, the user may appropriately register the first and second character strings in the dictionary database 50. In other words, the user may create a dictionary database 50 that reflects the user's intention to register the first and second character strings in association with each other.

Note that the time interval in the above example is 10 seconds. However, the time interval is not limited to 10 seconds. The time interval may also be defined while giving consideration to the type of application, the speed at which the user operates the character input device 10B, and/or the time-out time of the application. Accordingly, a configuration may alternatively be adopted in which the character input device 10B has a setting file (not shown in the figures) or the like, and the time interval is held in the setting file.

6. Variation 2

The above example has described a configuration in which the first character string "おうち"and the second character string "おうち時間"are registered in association with each other in the dictionary database 50. However, a configuration may alternatively be adopted in which the first and second character strings are registered in association with each other by analyzing morphemes of the second character string "おうち時間". Accordingly, the dictionary database 50 may configure more flexible predictive conversion candidates.

Note that one or more embodiments is not limited to the above examples, and may be embodied by varying the constituent elements without departing from the gist of one or more embodiments at the implementation stage. Also, various inventions may be made by appropriately combining a plurality of constituent elements disclosed in the above examples. For example, some constituent elements may be deleted from the constituent elements described in the above examples. Furthermore, constituent elements in different examples may also be combined as appropriate.

Further, the correspondence relationship between the configuration according to one or more embodiments and the above-described configuration may be described as in the following supplementary note.

Supplementary Note

A character input device includes: an output unit configured to output a first character string to an application program having a suggestion function; a detector configured to detect selection of a second character string that is presented in correspondence with the first character string by the application program; and a registration unit configured to register, in a dictionary database, the second character string that is detected, by the detector, to have been selected.

LIST OF REFERENCE NUMERALS 10, 10A, 10B Character input device
20 Display section 21 Character input portion
22 Candidate display portion
30 Detector
35 Display controller
40 Controller
41 Character string obtaining unit
42 Character string comparison unit
43 Application determination unit
44 Registration unit
45 Time measurement unit
50 Dictionary database
60 Output unit
80 Smartphone
200 Search field

The invention claimed is:

1. A character input device comprising:
a controller comprising a processor or processors configured with a program to perform operations comprising:
operation as an input portion configured to receive an input of a first character string;
operation as an output unit configured to output the first character string to a search field of an application program having a suggestion function;
operation as a display portion configured to display one or more candidate character strings presented by the suggestion function of the application program in correspondence with the first character string;
operation as a detector configured to detect a selection of a second character string of the one or more candidate character strings presented in correspondence with the first character string by the application program;
operation as a registration unit configured to register, in a dictionary database, the second character string the selection of which is detected, by the operation as detector; and
operation as a character string obtaining unit configured to obtain the first character string that is input or the selected second character string and to search the dictionary database to check whether the obtained character string is registered, wherein the processor or processors is configured with the program to perform operations such that:
the operation as the registration unit comprises registering the first character string and the second character string in association with each other in the dictionary database; and
the operation as the registration unit comprises not registering the second character string in the dictionary database if the second character string is already registered as a word in the dictionary database.

2. A character input method to be executed by a computer, the method comprising:
receiving an input of a first character string;
outputting the first character string to a search field of an application program having a suggestion function;
displaying one or more candidate character strings presented by the suggestion function of the application program in correspondence with the first character string;
detecting a selection of a second character string of the one or more candidate character strings presented in correspondence with the first character string by the application program; and
registering, in a dictionary database, the second character string the selection of which is detected; and obtaining the first character string that is input or the selected second character string and searching the dictionary database to check whether the obtained character string is registered, wherein registering the second character string comprises:
registering the first character string and the second character string in association with each other in the dictionary database; and
not registering the second character string in the dictionary database if the second character string is already registered as a word in the dictionary database.

3. A non-transitory computer-readable storage medium storing a character input program, which when read and executed, causes a computer to perform operations comprising:
receiving an input of a first character string;
outputting the first character string to a search field of an application program having a suggestion function;
displaying one or more candidate character strings presented by the suggestion function of the application program in correspondence with the first character string;
detecting a selection of a second character string of the one or more candidate strings presented in correspondence with the first character string by the application program; and
registering, in a dictionary database, the second character string the selection of which is detected; and
obtaining the first character string that is input or the selected second character string and searching the dictionary database to check whether the obtained character string is registered, wherein registering the second character string comprises:
registering the first character string and the second character string in association with each other in the dictionary database; and
not registering the second character string in the dictionary database if the second character string is already registered as a word in the dictionary database.

* * * * *